April 27, 1965
D. B. JOHNSTON ETAL
3,180,483
BAGGAGE HANDLING TURNTABLE ASSEMBLY
Filed Jan. 31, 1962
3 Sheets-Sheet 1
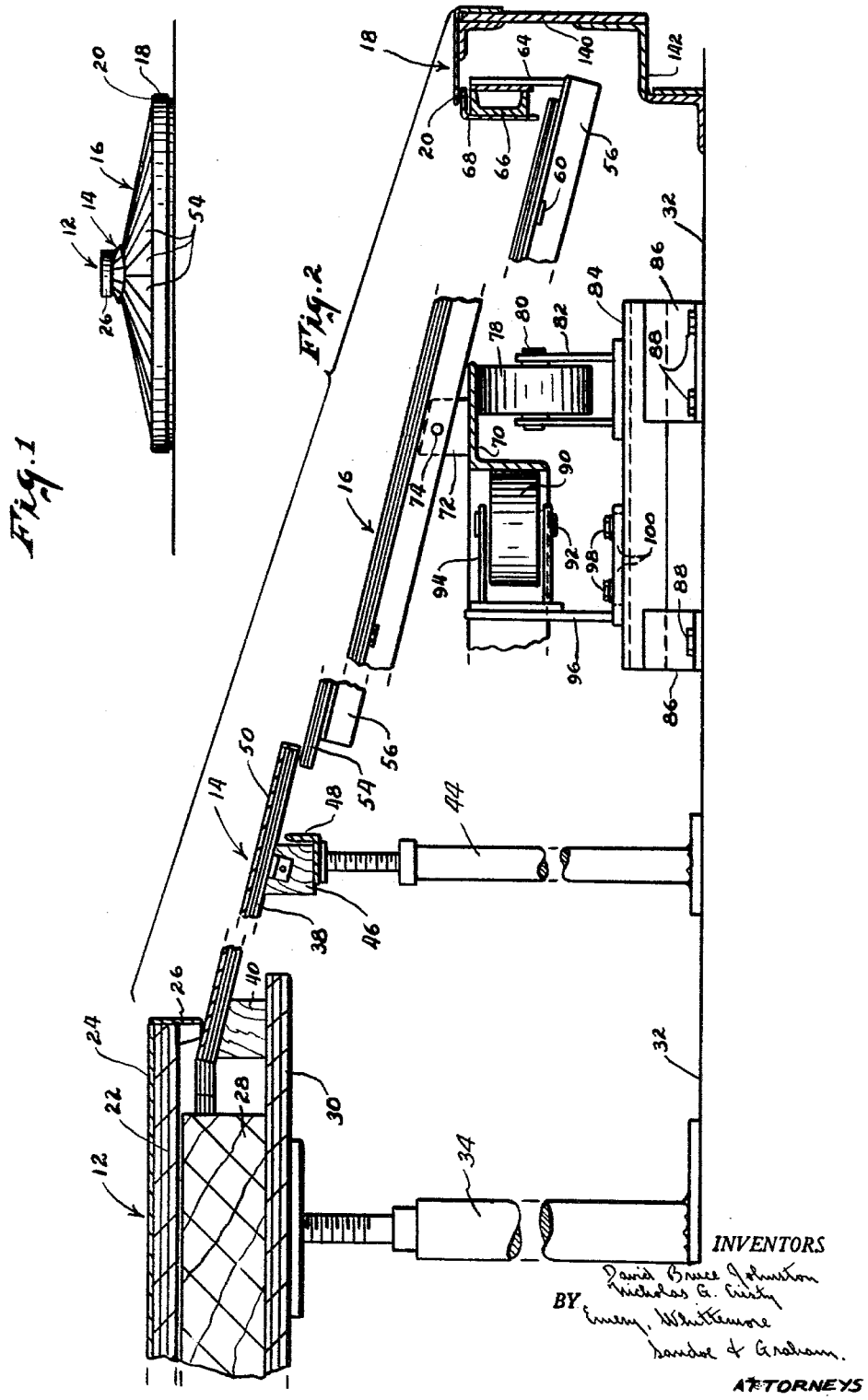
INVENTORS
David Bruce Johnston
Nicholas G. Cristy
BY Emery, Whittemore,
Sanders & Graham.
ATTORNEYS

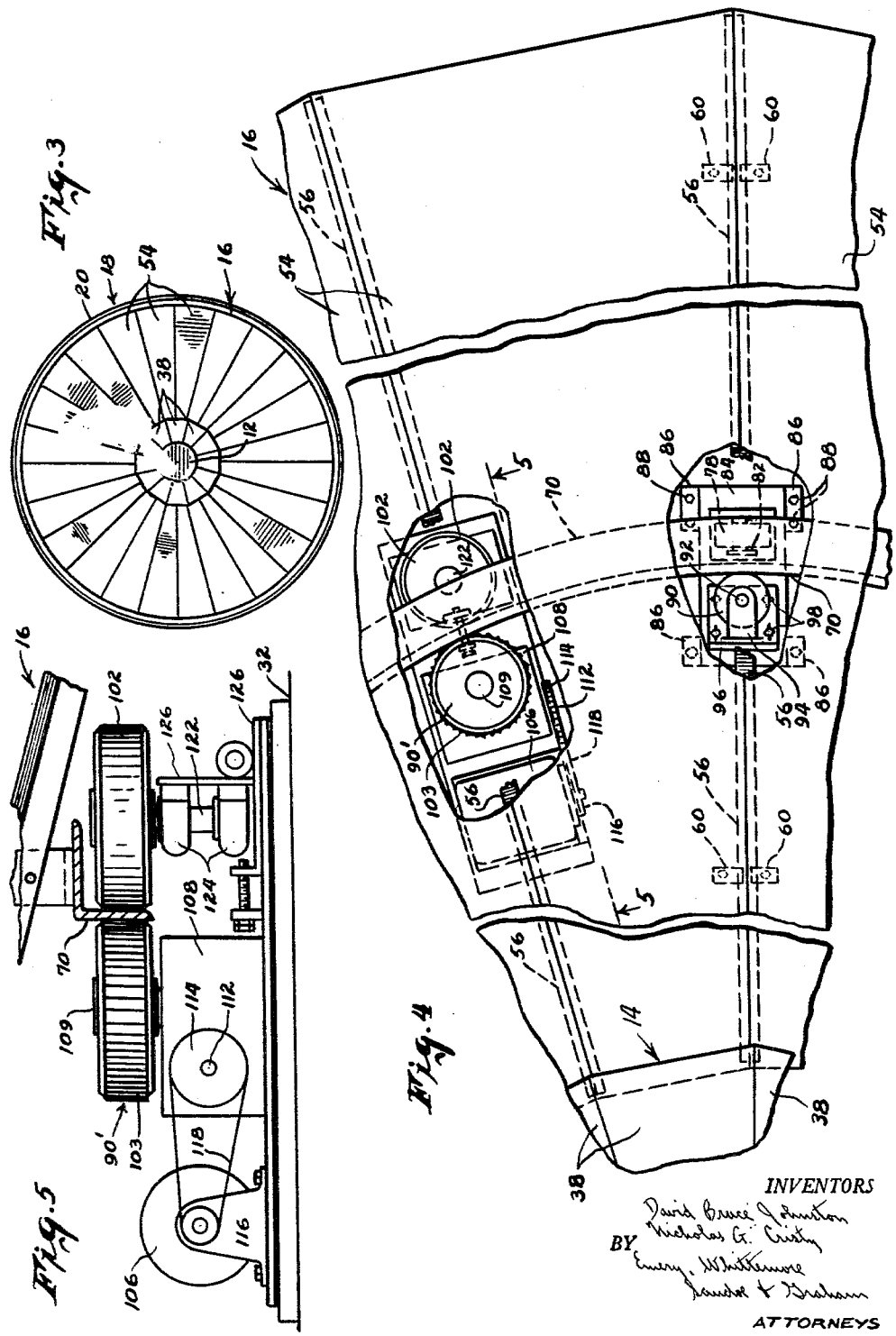

April 27, 1965   D. B. JOHNSTON ETAL   3,180,483
BAGGAGE HANDLING TURNTABLE ASSEMBLY
Filed Jan. 31, 1962   3 Sheets-Sheet 3

United States Patent Office 3,180,483
Patented Apr. 27, 1965

3,180,483
BAGGAGE HANDLING TURNTABLE ASSEMBLY
David Bruce Johnston, R.F.D. 3, Stamford, Conn., and Nicholas G. Cristy, 9 South View St., Pleasantville, N.Y.
Filed Jan. 31, 1962, Ser. No. 170,154
3 Claims. (Cl. 198—209)

This invention relates to turntables which are used for handling baggage. The invention is intended primarily for use at airport terminals, and especially for delivering baggage to passengers upon arrival at their destination.

One of the problems encountered in baggage handling is that the hand carts bringing the baggage often unload at the same locations where passengers are waiting to reclaim their baggage, and the passengers obstruct the prompt delivery and unloading of the hand carts which brings the baggage from the plane. Another problem is that passengers approach the rack and observe their own baggage at another location along the rack where other passengers are in the way and prevent prompt reclaiming of baggage.

It is the object of this invention to provide an improved turntable on which baggage may be unloaded and from which baggage can be claimed by the passengers. No matter where a passenger may be standing along the periphery of the turntable, his baggage will be delivered directly in front of him very shortly after it is placed on the turntable at a loading location.

Another object of the invention is to provide a turntable assembly having a stationary platform of limited radial extent around the periphery of the rotating portion of the turntable. This stationary platform protects passengers from moving into accidental contact with the rotating portion of the platform and also provides a support on which a piece of baggage can be rested by a passenger while reclaiming another piece from the rotating portion of the turntable. This stationary platform also provides a temporary support for baggage which is being transferred from a baggage-carrying cart to the turntable.

Other features of the invention relate to the mechanical construction of the turntable for obtaining a rugged and inexpensive construction and reliable operation by motor driving means.

One modification of the invention provides a turntable to which the baggage is delivered by a conveyor, and an open center portion of the turntable assembly provides space in which the airline employees can work.

Other objects, features, and advantages of the invention will appear or be pointed out as the description proceeds.

In the drawing, forming a part hereof, in which like reference characters indicate corresponding parts in all the views:

FIGURE 1 is a side elevation showing a baggage-handling turntable made in accordance with this invention;

FIGURE 2 is a greatly enlarged sectional view, partly broken away, showing the construction of the turntable illustrated in FIGURE 1;

FIGURE 3 is a top plan view of the turntable shown in FIGURES 1 and 2;

FIGURE 4 is a greatly enlarged, fragmentary, detail plan view of a portion of the turntable shown in the other figures.

FIGURE 5 is a diagrammatic side elevation taken on the line 5—5 of FIGURE 4.

Figure 6:
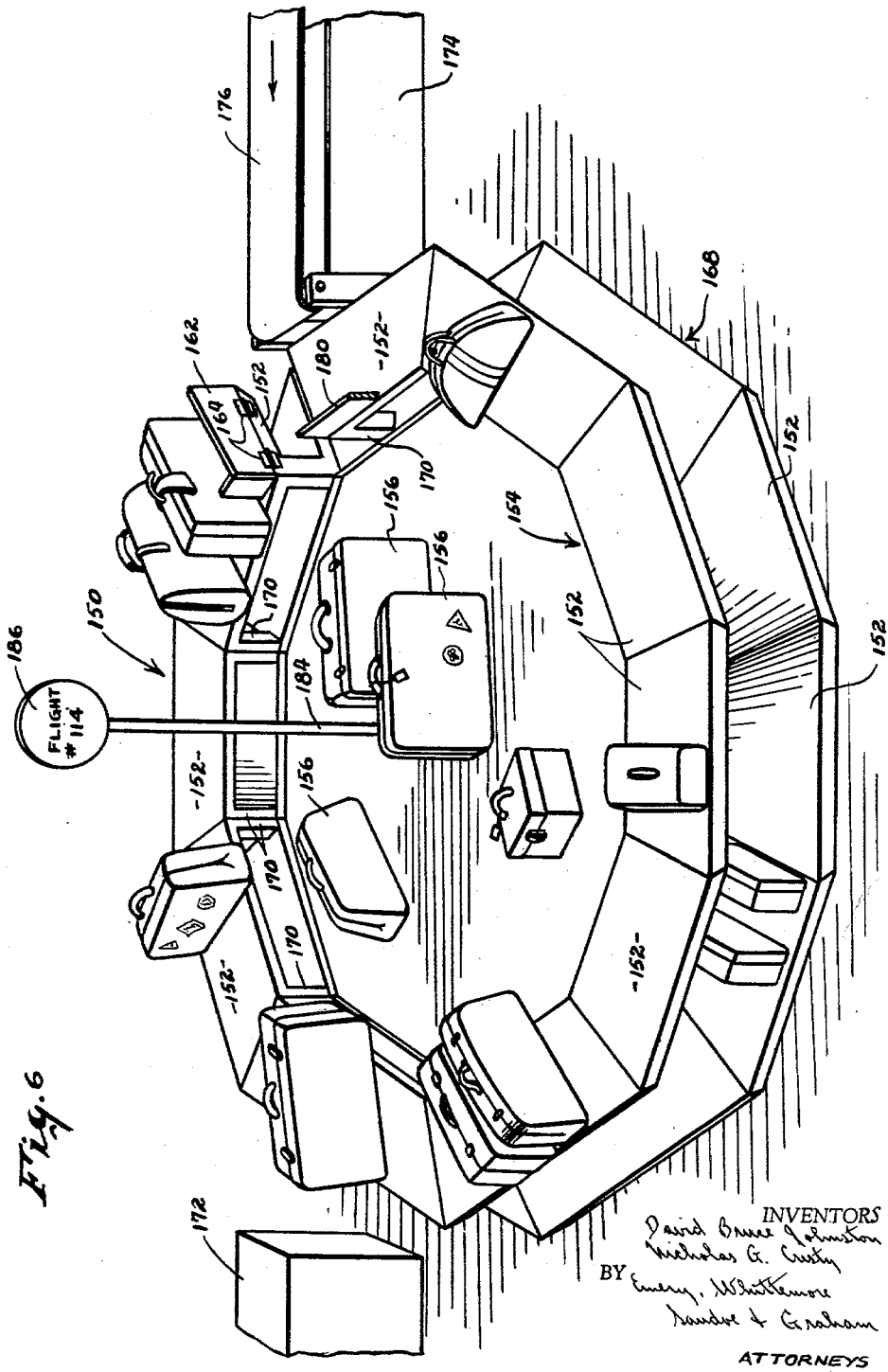
FIGURE 6 is a perspective view of a modified form of the invention.

The turntable shown in FIGURE 1 includes a stationary center platform 12 extending over the inner part of another stationary but frusto-conical platform 14.

The periphery of the stationary platform 14 extends over the inner edge of a rotary platform 16. Around the outer edge of the platform 16, there is a shroud 18 with a top wall 20 which extends radially inward over the peripheral portion of the rotary platform 16.

FIGURE 2 shows the stationary center platform 12 which is made of plywood 22 with a sheet metal covering 24 that is bent downwardly around the outer edge of the platform 12 to form a skirt 26. There are supporting blocks 28 under the plywood 22 and these rest on a lower plywood platform 30 which is supported from a floor 32 by vertically adjustable columns 34 consisting of screwjacks.

The stationary platform 14 is made up of flat panels 38 connected together along their radial edges to provide a generally frusto-conical surface. The platform 14 does not necessarily have to be frusto-conical but may be flat. The inner portion of each of the panels 38 is supported from the platform 30 by a block 40 attached to the platform 30 and preferably attached also to the lower side of the panel 38. Some distance out from the platform 30, each of the panels 38 is supported by a column 44, consisting of a jack screw, and there is a block 46 under each of the panels 38 and supported from the column 44. In the construction illustrated, a circular bracket 48 extends between the blocks 46 of each panel 38 and the columns 44 below the blocks.

The stationary platform 14, which may be constructed of plywood, preferably has a sheet metal covering 50 over the top of each panel 38 and extending downwardly over the peripheral edge of each panel.

The rotary platform 16 is made up of a plurality of flat panels 54 connected to radially extending frame elements 56. These frame elements 56 are located along the lines where the panels 54 come together; and in the preferred construction the frame elements 56 are T-sections with the stem extending downwardly and with clips 60 attached to the lower faces of the panels 54 and extending under opposite sides of the T-section frame elements 56 to attach the panels 54 to the frame elements.

All of the frame elements 56 have their outer ends attached to upwardly-extending brackets 64 and there is a channel 66 of annular contour secured to the brackets 64 of the different frame elements 56. An innner covering 68 of decorative sheet metal covers the annular channel 66 and extends outwardly over the top of the channel 66. Thus the brackets 64 and the channel 66 with its inner decorative covering 68 form an annular wall around the periphery of the rotary platform 16.

All of the radial frame elements 56 are attached to an annular rail 70 by brackets 72 which are connected with the frame elements 56 by fastenings 74. These brackets 72 are also connected to the rail 70, either by welding or other fastening means.

The platform 16 is supported by rollers 78 at annularly-spaced locations around the annular rail 70. Each of the rollers 78 has an axle 80 supported by a bearing support 82 on a base 84 attached to the floor 32 by brackets 86 and screws or other fastening means 88.

In the construction illustrated, the rail 70 is an angle section with the horizontal leg of the angle providing a bearing surface that rests on the rollers 78. These rollers support the turntable, but they do not restrain it against horizontal displacement. There are other rollers 90, at angularly-spaced locations around the rail 70, and in contact with the vertical leg of the rail 70 for restraining the rotary platform 16 against horizontal displacement.

Each of these rollers 90 has an axle 92 supported by a bearing support 94 which is in turn supported by a bracket 96 from the underlying support 84 which is attached to the floor 32. Each of the brackets 96 is attached to the support 84 by screws 98 extending through slots 100, in the bracket 96, for adjusting the associated roller 90 toward and from the annular rail 70. This provides for manufacturing and installation tolerances so that all of the rollers 90 can contact with the annular rail 70.

At one location along the length of the rail 70, there is a roller 102 (FIGURES 4 and 5), which contacts with the outside surface of the vertical leg of the rail 70 instead of contacting with the bottom surface of the horizontal leg of the rail. This roller 102 is on the opposite side of the rail from an adjacent roller 90' and the roller 102 presses the rail 70 against the roller 90' so as to maintain substantial friction between the roller 90' and the surface of the rail 70 with which the roller 90' comes in contact. A tire 103 or other friction means is applied to the roller 90' to increase the friction with the rail 70.

The rollers 90' and 102 are part of the driving means for rotating the platform 16. Power is applied to the roller 90' by an electric motor 106 which drives motion-transmitting connections in a speed reduction unit 108. An axle 109 of the roller 90' is the output shaft of the speed reduction unit 108. An input shaft 112 of the speed reduction unit 108 has a wheel 114 secured to it; and this wheel is driven from a wheel 116 on the armature shaft of the motor 106, by a belt 118. The wheels 114 and 116 may be pulleys or sprockets, and the belt 118 may be any type of belt, including a sprocket chain, as required by the nature of the wheels 114 and 116.

The roller 102 has an axle 122 supported by bearings 124 on a bracket 126. The wheels 90' and 102 are spring loaded together so that they are always in intimate contact with the rail 70. These wheels and the assemblies by which they are carried have radial movement as a unit to follow any out-of-roundness of the rail 60.

The motor 106, speed reduction unit 108, bracket 126 and lug 136 are all on the common support 128.

The shroud 18, around the outside of the turntable, is shown in section in FIGURE 2. It includes a vertical cylindrical portion 140 attached to the floor 32 by a bracket 142. This bracket has its lower end offset to provide the toe clearance which is conventional in front of counters. The shroud 18 has an inwardly-extending portion which forms the top wall 20 and which overlaps a part of the area of the covering 68. There is a clearance between the top wall 20 of the shroud and the covering 68 at the top of the wall of the rotary platform 16.

FIGURE 6 shows a modified form of the invention in which a platform 150 is made with panels 152 connected together to form a generally frusto-conical upper portion 154 of the turntable. In this modified construction, the inside radius of the platform 154 is very much larger than in the construction illustrated in the other figures and this leaves a large interior section of the floor exposed so that some luggage 156 can be stored on the floor within the confines of the turntable, and employees of the airline can work within this space. In order to make it unnecessary for employees to climb over the turntable there is a panel 162 which is attached to an adjacent panel 152 by hinges 164 that permit the panel 162 to swing upwardly so that employees can pass into the space enclosed by the turntable.

The platform 150 has a lower portion 168 which is made up of panels 152 that may be identical in construction with the upper panels 152. This lower portion 168 has an annular rail secured to its lower side and by which the turntable is supported on rollers in a manner similar to that described in the other figures of the drawings.

The upper platform 154 is supported from the lower platform 168 by vertical structural elements 170 at opposite ends of the various panels 152 which make up the platforms of the turntable. Small luggage can be placed on the lower platform 168 through the space between the upper and lower platforms at the inside of the turntable. The spacing between the upper and lower platforms 154 and 168 can be made larger than is illustrated in FIGURE 6 in order to take larger baggage, but it is preferable to limit this clearance so as to leave the upper platform 154 at a convenient height for passengers to remove baggage from the upper platform 154 while standing on the floor adjacent to the turntable.

In FIGURE 6, the turntable 150 is located in a space between counters 172 and 174. The space behind the counters may be used by employees who are loading baggage on the platform, or some or all of the baggage may be located on the upper platform 154 by a conveyor 176 which is shown on top of the counter 174.

When the conveyor 176 is used, backstops 180 can be placed at the upper ends of the panels 152 to permit the conveyor 176 to run faster without danger of pushing any of the baggage over the top end of a panel 152.

Within the space surrounded by the turntable 150, there is a post 184 extending upwardly from the floor with a sign 186 identifying the flight from which the baggage on the turntable has been delivered.

The invention has been illustrated and described, but changes and modifications can be made and some features can be used in different combinations without departing from the invention as defined in the claims.

What is claimed is:

1. The baggage handling turntable assembly comprising a movable platform that slopes downwardly toward its periphery and that is open at its center whereby the movable platform has a generally frusto-conical top surface,
   supporting means located under the frusto-conical surface of the movable platform and on which the movable platform is rotatable,
   power-driving means for rotating the movable platform on the supporting means,
   a wall on the movable platform adjacent to the outer periphery of said movable platform,
   and a stationary center platform supported from within the open space at the center of the movable platform and overlapping the peripheral edge portion of the movable platform adjacent to the inner edges of the movable platform.

2. The baggage handling turntable assembly described in claim 1 characterized by the supporting means being radially inward from the periphery of the platform,
   the wall adjacent to the outer periphery of the movable platform extending upward from the platform and being connected with the platform for rotation as a unit therewith, the top of the wall being at a lower level than the radially inner portion of the platform,
   a stationary shroud around the platform just beyond the periphery of the platform and extending upwardly to a level above the top of the wall and then inwardly across at least a portion of the top of the wall, at a level lower than most of the radial width of the frusto-conical platform.

3. A baggage handling turntable assembly comprising a continuously rotatable platform that slopes downwardly toward its periphery,
   (a) an annular element attached to the underside of the platform and having a horizontally-extending annular bottom surface and having also vertically-extending surfaces on opposite sides thereof,
   (b) a first group of rollers that are at angularly spaced locations around the annular element and pressing radially against the vertically-extending surface on one side of the annular element to prevent transverse displacement of the turntable,
   (c) another group of rollers that are at angularly spaced locations around the turntable and on which the annular element rests with the rollers of this other group in contact with said horizontally-extending annular bottom surface, (d) a roller on the other side of the annular element from one of the rollers of the first group and pressing against the vertically-extending surface on the other side of the annular element to maintain substantial friction between the opposing rollers and the annular element, (e) power-driving mechanism that rotates one of the radially pressing rollers to impart rotation to the turntable, (f) the rotatable platform being open at its center whereby the platform is generally frusto-conical shape, (g) and a stationary center platform with peripheral edge portions that are adjacent to the inner edges of the rotating platform whereby a substantially continuous surface is provided for pieces of baggage to slide freely from the stationary platform to the rotating platform.

References Cited in the file of this patent

UNITED STATES PATENTS

| | | |
|---|---|---|
| 816,620 | Turner | Apr. 3, 1906 |
| 1,046,853 | Proal | Dec. 10, 1912 |
| 1,204,428 | Grandfield | Nov. 14, 1916 |
| 1,474,488 | Nelson | Nov. 20, 1923 |
| 1,699,538 | Keller | Jan. 22, 1929 |
| 2,447,072 | Jones | Aug. 17, 1948 |
| 2,575,914 | Griffin | Nov. 20, 1951 |
| 2,705,474 | Sicilian | Apr. 5, 1955 |
| 2,818,162 | Mussochoot | Dec. 31, 1957 |
| 2,826,319 | Renner | Mar. 11, 1958 |
| 2,893,542 | Watkins et al. | July 7, 1959 |
| 3,039,565 | Egner | July 19, 1962 |